United States Patent [19]

Potente et al.

[11] Patent Number: 4,871,598
[45] Date of Patent: Oct. 3, 1989

[54] CONTAINER WITH FLEXIBLE WALLS

[75] Inventors: Eugen Potente, Aachen; Herbert Scheller, Würselen, both of Fed. Rep. of Germany

[73] Assignee: Uniroyal Engelbert Reifen GmbH, Aachen, Fed. Rep. of Germany

[21] Appl. No.: 214,639

[22] Filed: Jul. 1, 1988

[30] Foreign Application Priority Data

Jul. 6, 1987 [DE] Fed. Rep. of Germany ....... 3722255

[51] Int. Cl.⁴ ..................... B65D 90/02; B64D 37/00
[52] U.S. Cl. .................................. 428/36.1; 220/453;
    220/455; 220/900; 244/135 B; 428/36.6;
    428/108; 428/113; 428/246; 428/250; 428/254;
    428/286; 428/287; 428/290; 428/911; 428/36.8
[58] Field of Search ............... 428/107, 108, 113, 250,
    428/254, 286, 287, 290, 911, 246, 36.2, 36.8,
    36.6, 36.1; 150/55; 220/455, 453, 85 B, 901, 1 B,
    900; 244/135 B

[56] References Cited

U.S. PATENT DOCUMENTS

| | | | |
|---|---|---|---|
| 3,880,217 | 4/1975 | Musyt et al. | 150/55 |
| 3,951,190 | 4/1976 | Suter | 150/55 |
| 4,360,124 | 11/1982 | Knaus et al. | 244/135 B |
| 4,368,086 | 1/1983 | Villemain | 244/135 B |
| 4,443,506 | 4/1984 | Schmolmann et al. | 428/911 |
| 4,631,225 | 12/1986 | Nishimura | 244/135 B |
| 4,737,401 | 4/1988 | Harpell et al. | 428/911 |

Primary Examiner—Ellis P. Robinson
Assistant Examiner—James J. Seidleck
Attorney, Agent, or Firm—Becker & Becker, Inc.

[57] ABSTRACT

A container having flexible walls. One or more layers of a high-strength load-carrying member are provided, with the member including meandering, aromatic, polyamide cords, with a cover material having a relatively slight adhesion to the cord. Where several layers of load-carrying members are provided, the meandering cords are angularly shifted so that the cords of one layer cross the cords of another layer.

6 Claims, 1 Drawing Sheet

CONTAINER WITH FLEXIBLE WALLS

BACKGROUND OF THE INVENTION

The present invention relates to a container having flexible walls that comprise one or more layers of a high-strength load-carrying member in the form of a coated cord fabric, especially an aromatic polyamide fabric disposed in a cover material, with the walls also comprising an inner lining in the form of a rubber layer, a polyamide barrier layer, and one or more natural rubber layers that can swell or expand.

A container of this general type is disclosed in German Pat. No. 30 15 974 Potente et al dated Mar. 6, 1986 and belonging to the assignee of the present invention. It is shock- and impact-resistant, assures a reliable sealing effect, and the walls have a high elastic energy absorption capability. This heretofore known container provides a limited bullet proof quality against conventional small caliber ammunition. However, an effective bullet proof characteristic against the threat of large caliber ammunition is not assured, even if the high-strength load-carrying member is in the form of a cross fabric construction, because such a construction and arrangement results in a wall that is not elastic enough.

It is therefore an object of the present invention to improve a container of the aforementioned general type in such a way that the load-carrying members have a construction and arrangement as a result of which they are placed in a condition to first convert the high kinetic energy of a high energy bullet into work, and to then absorb this converted energy as a result of the high specific tensile strength, to thereby keep the damaged spots when fired upon as small as possible or to avoid these spots.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

Figures 1, 2:
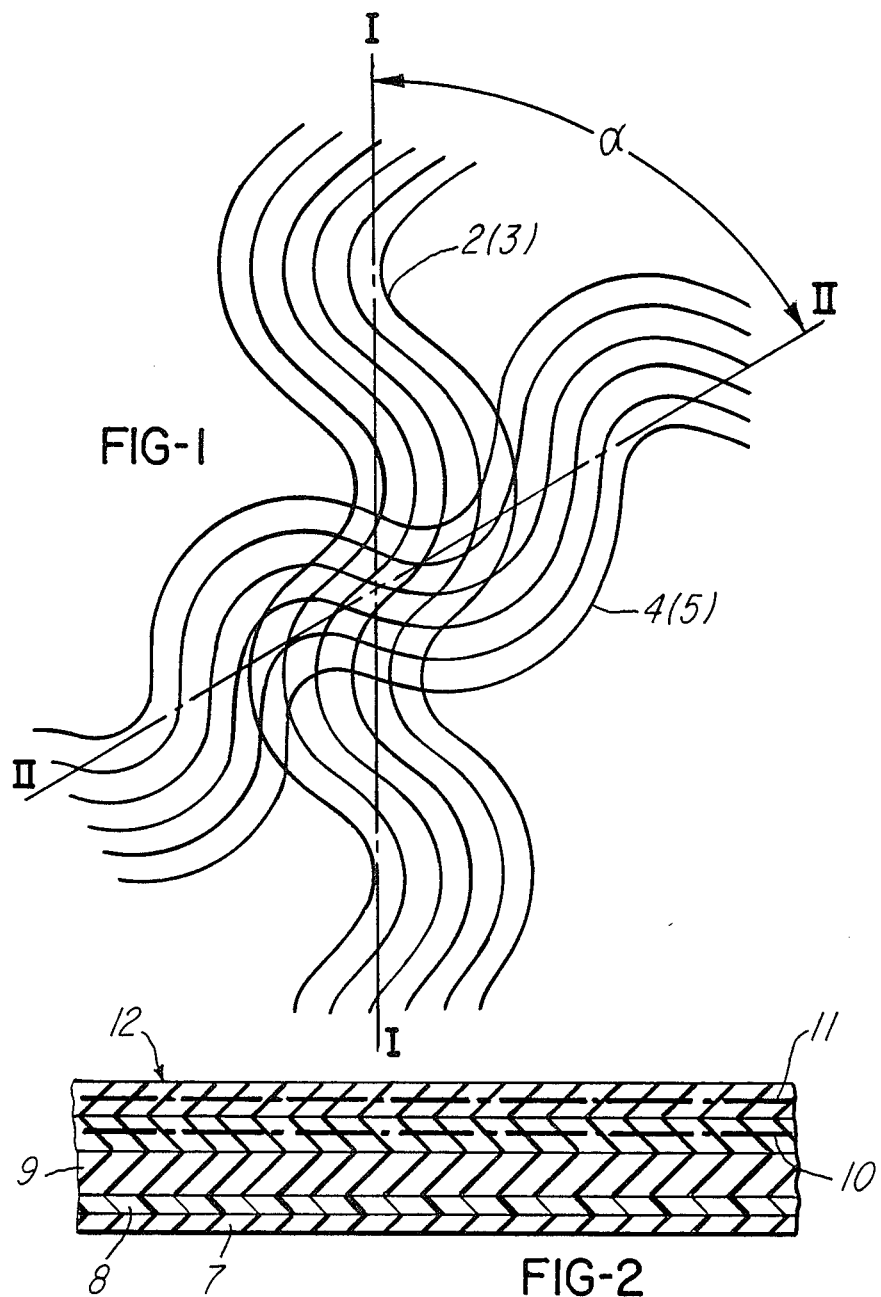
FIG. 1 is a plan view of one exemplary embodiment of the inventive meandering arrangement of adjacent aramid cords.
FIG. 2 is a cross-sectional view through one exemplary embodiment of an inventive container wall.

The inventive container has a flexible wall that comprises, in sequence: an inner lining in the form of a rubber layer; a barrier layer, such as a polyamide barrier layer; one or more natural rubber layers that can swell or expand; and one or more layers in the form of a high-strength load-carrying member of coated cord fabric, especially an aromatic polyamide fabric, whereby the coated cord fabric comprises cords that are disposed in a cover material, with the cords being disposed in a meandering pattern, and the cover material having a slight adhesion to the cords therein.

High-strength cords disposed in a container wall in this fashion are in a position to lengthen or "stretch", because due to the meandering pattern of the cords, a reserve length is available if a foreign body strikes the load-carrying member. Due to the relatively low adhesion of the cover material to the cord, the cords are furthermore in a position to move into the surrounding region. As a result, there is effected an adequate stretching of the cords via a linear displacement of the meandering pattern. The kinetic energy of the large caliber bullet or bullet fragments is to this extent first converted into work.

During the stretching or extension of the meandering cords, work is expended. Only then does the cord undergo tensile stress. For an aramid fiber, for example, the tensile strength is 2760 N/mm$^2$, and is in the range of the tensile strength of a steel wire. The meandering pattern of the cord is preferably wavelike, and for example with an aramid cord of the type 1670/2 having approximately 100 to 110 cords/dm, can have an amplitude of approximately 30 to 50 mm, and a meandering height of approximately 10 to 15 mm.

An effective bullet proof characteristic for such a container is achieved when the aromatic polyamide cords, which have a meandering pattern and a slight adhesion to the cover material, are present in two or more plies or layers where the cords of one layer cross the cords of another layer. Such a crossed arrangement is in a position to convert the high kinetic energy of a striking bullet or bullet fragment into work and tensile stress. The damage spots when the container is fired upon is kept small or are even prevented as a result of the extension of each directly or indirectly struck meandering cord in the crossed arrangement of the layers, and as a result of the tensile strength of the high-strength cords of a double or multiply overlapping arrangement.

In addition, a container embodied in this manner can also have an outer protective shell. This shell is also provided with meandering cords of aromatic polyamide, with these cords being disposed in the protective shell in an existing resin or synthetic material matrix having relatively low adhesion. The meandering cords can be provided in a single layer or several layers, whereby if several layers are provided the cords of one layer cross those of another layer. A protective shell embodied in such a manner provides, depending upon the type of container, an additional safety feature against impact. In a configuration of meandering, high-strength, aromatic polyamide cords, an additional protection against being fired upon is provided because the protective shell absorbs the high pressure that occurs upon penetration of a bullet, splinters, or fragments into the container, and bridges the metallic wall portions of the container or the receiving structure that have been flanged open as a result of the shooting.

Further specific features of the present invention will be described in detail subsequently.

DESCRIPTION OF PREFERRED EMBODIMENTS

Referring now to the drawing in detail, the arrangement illustrated in FIG. 1 comprises meandering aramid cords 2 in a first cord ply or layer 3, and also meandering aramid cords 4 of a further cord ply or layer 5. The cords 2 and 4 of the two layers 3 and 5 are angularly shifted relative to one another, so that the cords of one layer cross the cords of the other layer. The angle between the directions I—I and II—II in which the cords 2 and 4 respectively extend is designated by the reference symbol α and can be from 0 to 90°. The cords 2 and 4 meander in a wavelike manner. If an aramid cord of the type 1670/2 with 110 cords/dm width is used, the amplitude width is 30 mm and the height is 10 mm.

The container wall illustrated in FIG. 2 comprises an inner lining 7 of rubber or a rubberized fabric, a barrier or protective layer 8, for example of a polyamide layer, a self-sealing rubber layer 9 of a natural rubber that can swell or expand, and the two layers 10 and 11 of load-carrying cords. In particular, these layers 10 and 11 comprise high-strength aramid cords that are disposed in a meanderlike fashion and in an angularly shifted manner such that the cords of one layer cross the cords of the other layer. The cover material for the aramid cords is designated by the reference numeral 12 and is rubber.

In comparison to a conventional aramid fabric, the inventive meandering aramid cord fabric has an approximately ten times greater energy absorption capability due to the meandering pattern, is shock- and impact-proof or resistant, and is essentially bullet proof when fired upon by high energy bullets, shells, or other projectiles. If the container is intended to hold fuel or propellant, the polyamide layer is provided as a barrier layer in order to keep diffusion low. The natural rubber layer in the container wall, which natural rubber layer can swell or expand, is provided as a self-sealing mass for the situation where a damaged part of the wall must reliably seal itself.

The present invention is, of course, in no way restricted to the specific disclosure of the specification and drawing, but also encompasses any modifications within the scope of the appended claims.

What we claim is:

1. A container for fluid content including fuel and having multi-layer flexible walls that comprise, in sequence:
   an inner lining in the form of a rubber layer compatible with fluid content;
   a barrier layer that holds the fluid content in the container;
   at least one natural layer that is thicker than said inner lining and that can expand and swells when in contact with the fluid content for a self sealing of any puncture thereof that occurs; and
   at least one reinforcement layer in the form of a high-strength load-carrying member of coated cord fabric comprising cords disposed in a coating cover material, with said cords being disposed in a wavy cord arrangement having a multi-plane meandering pattern so that said cords can extend as well as elongate into a different plane in conjuction therewith for cord length reserve to allow the cords to extend themselves in a more straightened manner and to withstand pojectile impact forces kept from puncturing the container with only at most small and limited damage locations quickly subject to the self sealing of any puncture thereof without any overlap folds and to avoid any large loss of fluid content, and said cover material having a slight adhesion to said cords therein in order to help consume impact energy when the cords extend and elongate in the more straightened manner.

2. A container according to claim 1, in which said barrier layer is a polyamide barrier layer, and said cord fabric is an aromatic polyamide fabric.

3. A container according to claim 1, which includes two layers of load-carrying members of coated cord fabric, with the meandering cords of one of said layers being disposed at an angle of 0°–90° to the meandering cords of the other of said layers, so that the meandering cords of one layer cross the meandering cords of the other layer.

4. A container according to claim 3, in which said meandering cord pattern is a uniform wavelike pattern.

5. A container according to claim 1, which, on said at least one layer in the form of a load-carrying member, remote from said natural rubber layer, includes an outer protective shell that comprises a cover material in which are disposed high-strength load-carrying cords that are disposed in a meandering pattern.

6. A container according to claim 5, in which said cords are aromatic, polyamide cords that are coated also with a material selected from the group consisting of synthetic resin and other plastics.

* * * * *

UNITED STATES PATENT AND TRADEMARK OFFICE
CERTIFICATE OF CORRECTION

PATENT NO. : 4,871,598
DATED : Oct. 3, 1989
INVENTOR(S) : EUGEN POTENTE ET AL

It is certified that error appears in the above-identified patent and that said Letters Patent is hereby corrected as shown below:

On the cover page of the abovementioned patent the spelling of the name of the Assignee should be as follows:

[73] Assignee: Uniroyal Englebert Reifen GmbH, Aachen, Fed. Rep. of Germany

Signed and Sealed this

Ninth Day of October, 1990

Attest:

HARRY F. MANBECK, JR.

*Attesting Officer*   *Commissioner of Patents and Trademarks*